United States Patent [19]

Hoppe et al.

[11] 3,869,337

[45] Mar. 4, 1975

[54] COMPOSITE NON-WOVEN MATS AND FOAM PLASTIC ARTICLES REINFORCED THEREWITH

[75] Inventors: Peter Hoppe, Troisdorf; Helmut Leyer, Opladen; Johann Müller, Cologne, all of Germany

[73] Assignee: Beyer Aktiengesellschaft, Leverkusen, Germany

[22] Filed: Feb. 11, 1972

[21] Appl. No.: 225,666

[30] Foreign Application Priority Data

Feb. 12, 1971 Germany.............................. 2106729

[52] U.S. Cl.................. 161/159, 156/78, 156/148, 161/154, 161/155, 161/160, 161/166, 161/170, 264/45, 264/257
[51] Int. Cl.............................................. B32b 5/18
[58] Field of Search ......... 161/53, 64, 67, 154, 156, 161/155, 159, 166, 173, 160, 161; 156/77–79, 148; 264/45, 257, 48

[56] References Cited

UNITED STATES PATENTS

| 3,255,509 | 6/1966 | Newman et al..................... 161/154 |
| 3,476,636 | 11/1969 | Crosby................................ 161/67 |
| 3,506,529 | 4/1970 | Sanders............................... 161/67 |
| 3,523,059 | 8/1970 | Coates................................ 161/59 |
| 3,546,060 | 5/1967 | Hoppe et al. ...................... 161/159 |
| 3,591,444 | 7/1971 | Hoppe ................................ 161/53 |

Primary Examiner—George F. Lesmes
Assistant Examiner—James J. Bell
Attorney, Agent, or Firm—Plumley & Tyner

[57] ABSTRACT

A composite non-woven synthetic fibre mat is used for reinforcing foam plastic articles or structures. The non-woven mat consists of two non-woven fleeces being firmly bonded together. The foam plastic articles or structures are reinforced with the composite non-woven fibre mat in their marginal zones. Preferably the foam plastic is a polyurethane.

2 Claims, No Drawings

COMPOSITE NON-WOVEN MATS AND FOAM PLASTIC ARTICLES REINFORCED THEREWITH

This invention relates to composite non-woven mats from synthetic fibres for reinforcing marginal zones of foam plastic articles and to foam plastic articles, especially of polyurethane, which are reinforced with these composite non-woven mats.

It is known to make articles of foam plastics which comprise adjacent to their outer surface a zone of reinforced foam plastics. These articles may also comprise an outer surface layer which may be made e.g. of metal, if heavy loaded moulded articles are desired. Such articles are conveniently made by placing the reinforcement in a hollow mould and then allowing a foamable plastics mixture to foam inside this mould. In this way the reinforcement is permeated with the foam to provide a moulded article with the desired surface reinforced zone. Alternatively the outer surface layer may be a thin layer of plastics, particularly a so-called gelcoat. This can be applied to the inside of the mould and the reinforcement can then be held in place by the adhesive properties of the gel-coat. It is also known to make what are termed "sandwich constructions" which comprise two outer surface layers of high strength resistance and sandwiched between them a foam plastics layer, which may if desired be reinforced.

Furthermore, it is known to use non-woven fabrics of coarse titre crimped polyamide fibres for providing the reinforcement in the surface of moulded articles or the reinforcing of the marginal zone of a sandwich-core. The use of such non-woven fabrics for reinforcing these sandwich-cores has advantages in that the outer layers or skin of the sandwich-system, which tend to be subjected to considerable mechanical stresses, are deeply anchored in the foam plastics by these coarse fibres. When such fleeces or mats are placed inside the hollow mould before foaming the rigidity of the fibres has the advantage that it tends to stop the fleece from being displaced from it's original position by the expanding foaming mixture. However, the use of such coarse crimped fibres is also attended with certain difficulties. Thus it is generally desirable to ensure that the reinforcing insert is firmly anchored to the walls of the mould, or to the outer surface layer or sandwich skin when this is used. The inner surface of the mould or the inside of the outer surface layer may first be primed with an adhesive layer which may be a gel coat or some other suitable adhesive. When the fleece is pressed into such a layer on the inside of the mould wall or of the outer surface layer it tends to spring back again and leaves only a small proportion of the fleece fixed in the adhesive layer. This means that the fleece tends to be inadequately anchored to the mould wall or outer surface layer and it may become detached from this surface during the foaming in which case that part of the outer surface of the moulding will not be properly reinforced and will be defficient in strength. It is the object of the invention to provide a new form of composite non-woven fibre mat which is used as reinforcement for foam plastic articles or for sandwich-core and which mitigates these disadvantages.

According to the invention there is provided a composite non-woven synthetic fibre mat for reinforcing marginal zones of foam plastic articles or structures which comprises a non-woven mat of crimped polyamide staple fibres having a titre of at least 40 dtex and on one surface of said mat and firmly bonded to it, a second mat of fine synthetic titre staple fibres or synthetic filaments. Preferably the fine titre staple fibres or filaments have a titre of 2 to 10 dtex and that the weight per m$^2$ of the mat of the fine fibres should be 50 to 500 g and the polyamide staple fibres should have a titre of 40 to 100 dtex. The mat of the polyamide fibres have a weight of 80 to 200 g/m$^2$.

Furthermore the non-woven mat of the fine fibres is preferably bonded to the mat of the polyamide fibres by needling (stitching) or by flame bonding.

Polyamide-6 and polyamide-6,6 staple fibres may be used for the preparation of the non-woven mats and the mat-forming fine-titre fibres or filaments are from polyacrylonitrile, linear polyesters or synthetic polyamides. Preferably both fibres- the coarse-titre polyamide fibres and the fine-titre fibres are textured fibres. The non-woven fibre mat or fleece is produced by methods known in the art e.g. by carding of staple fibres or by the aerodynamic method. The non-woven mat layers are usually needled (stitched) to a fleece mat by introducing superposed non-woven layers in a needling (stitching) machine in order to strengthen the composite non-woven mat or fleece. In use the composite non-woven mat is always placed so that the fine-titre fibres or filaments are facing towards outside of the moulded article. The non-woven mat of the fine-titre fibres or filaments is readily impregnated and can therefore be readily embedded in the wet priming or adhesive layer inside the mould or outer surface layer. It is preferred that when the composite non-woven mat has been applied to the priming layer that approximately one-tenth to one-twentieth of its thickness should be embedded in this layer.

It will of course be understood that different combinations of non-woven fleeces from fine-titre fibres and from coarse-titre, textured fibres can be used depending on the type of foam plastic products to be produced. A choice depends partly on the function which the moulded article is intended to carry out. Thus it may be that the article is intended to serve a structural purpose and will be liable to be subjected to large static and dynamic stresses. On the other hand it may only be subjected to short but powerful impacts e.g. articles which are used in vehicle constructions or for protective padding purposes.

Generally speaking the non-woven mat of the coarse-titre crimped polyamide fibres should have a weight per m$^2$ of 80 to 200 g, as has been stated above, in order to ensure that the non-woven mat of the fine-titre fibres is firmly and deeply anchored in the foam plastic-core. However, the weight per m$^2$ of the non-woven mat of the fine-titre fibres depends to a much greater extent on the purpose for which the article is intended. It also depends to some extent on the type of surface layer or sandwich-skin which is used (which may be a layer of e.g. metal, plywood or glass fibre reinforced plastic). As has been stated above the weight per m$^2$ of the non-woven mat of the fine-titre fibres may preferably vary between 50 to 500 g. Thus when the outer surface layer is a thermoplastic material having a thickness of 1 mm and an elastic modulus of $0.025 \times 10^6$ the non-woven mat of the fine-titre fibres preferably has a weight of 100 g/m$^2$.

A further object of the invention are foam plastic articles or structures having marginal zones reinforced with a non-woven fibre mat which comprise a composite non-woven synthetic fibre mat-embedded in said marginal zones- consisting of a non-woven mat of crimped synthetic polyamide staple fibres having a titre of at least 40 dtex and a second non-woven mat of fine-titre textured synthetic staple fibres or textured synthetic filaments, said second non-woven mat being firmly bonded to one surface of the non-woven polyamide fibre mat, said second non-woven mat is placed adjacent to the outer surface of the marginal zone.

These reinforced foam plastic articles are prepared by introducing the composite non-woven mat into the mould which is used for foaming in such a manner that the fine-titre fibre mat is placed adjacent to the inside wall of the mould and filling the mould with a foamable plastic mixture, preferably with a polyurethane foam-mixture.

If desired the inside walls of a mould may initially be provided with an outer surface layer which will form a shell for the finished foam plastics article. This outer surface layer may be e.g. a shell of metal, glass fibre reinforced plastics or of thermoplastic material. The inner walls of the mould or the outer surface layer may be coated with a priming layer e.g. a gel coat of polyurethane before foaming. The non-woven mat of fine-titre fibres can then readily be anchored in the still wet priming layer. It will of course be realized that the composite non-woven synthetic fibre mat can be used for reinforcing rigid, semi-rigid and soft foam articles, such as of epoxi-resins, polyester-resins, and preferably polyurethanes. The techniques involved in the production of these foam plastics articles having a zone adjacent to their outer surface which is reinforced is known and described, e.g. in U.K. Pat. No. 1,233,910. The techniques involved in formulating the foamable reaction mixtures and in introducing these into the mould are well known.

The following examples illustrate the invention:-

Example 1 (production of a foam-article with a surface consisting of a gel coat and the reinforcement of the composite mat)

A fleece of coarse-titre, crimped polyamide-6 staple fibres of dtex 80 was prepared by carding the staple fibres in a carding machine so that a fleece was obtained having a weight of 150 g/m². The layer of the formed polyamide-6 fibre fleece was introduced together with a fleece-layer of fine-titre polyacrylonitrile staple fibres of dtex 5 having a weight of 100 g/m² in a needling (stitching) machine, so that the polyamide-6 staple fibre mat was needled on one side to the non-woven fleece of fine-titre polyacrylonitrile staple fibres.

The composite mat thus obtained was introduced into a mould used for foaming with the fleece of the fine fibres immediately adjacent to the inner walls of the mould which was prepared with a gel coat. A foamable polyurethane reaction mixture was introduced into the mould in such a quantity as to produce an average density of the foam of 80 kg/$m^3$ (=0,08 gr/cm³). After foaming it was found that the density of the foam marginal zone reinforced by the fleece of the fine-titre fibres was 180 kg/$m^3$ (=0,18 gr/cm³), 80 kg/$m^3$ (=0,08 gr/cm³) in the foam marginal zone reinforced by the fleece of the coarse crimped polyamide fibres and 50 kg/$m^3$ (density 0,05) in the interior of the foam-article where there was no reinforcement.

Example 2 (production of RFP-sandwich-construction with high loading capacity)

The composite non-woven fibre mat was prepared according to Example 1 from crimped polyamide-6 fibres (dtex 80) forming a non-woven layer having a weight of 150 g/m² and from textured polyester fibres (dtex 5) forming a non-woven layer having a weight of 200 g/m².

To produce a sandwich-structure, an outer surface layer or skin of glass fibre reinforced polyester resin having a thickness of 1 mm and an elastic modulus of 0.1 × 10⁶ kg/cm² was installed into the mould after preparing the inside of the skin with an adhesive. After introducing the composite non-woven needled fibre mat into the adhesive and after the polymerisation of the adhesive, the foamable polyurethane reaction mixture is added in such a quantity as to produce an average density of the foam of 100 kg/m³ (=0.1 gr/cm³). The finished article shows a crush resistance in the marginal zones up to the tensile strength of the RFP-material (=1500 kp/cm²).

Example 3 (production of a metal-sandwich construction)

The composite non-woven fibre mat was prepared according to Example 2 using a non-woven layer of crimped polyamide-6-fibres (dtex 80) having a weight of 150 g/cm² and a non-woven layer of textured polyester fibres (dtex 5) having a weight of 200 g/cm². In forming a reinforced foam polyurethane structure, an outer surface layer consisting of steel (0.2 mm thick, an elastic modulus of 2,1 × 10⁶ kg/cm² and a tension limit of 6000 kp/cm²) is used. After inserting the composite non-woven needled fibre mat to the inside of the metal skin, which was prepared with an adhesive, the foamable polyurethane reaction mixture is added in such a quantity as to produce a foamed polyurethane sandwich core having an average density of 120 kg/m³ (=0.12 gr/cm³). The foam polyurethane sandwich structure shows a crush resistance in the metal zones up to the tension limit of 6000 kp/cm².

What we claim is:

1. In a foam plastic article or foam core having marginal zones reinforced with a fiber mat, the improvement which comprises using as the fiber mat, a composite non-woven synthetic fiber mat consisting of a non-woven mat of crimped synthetic polyamide staple fibers having a titer of 40–100 dtex and a weight of 80–200 gm/m² and a second non-woven mat of fine titer textured synthetic staple fibers or textured synthetic filaments, said second non-woven mat having a titer of 2–10 dtex and a weight of 50–500 gm/m² and being firmly bonded to one surface of the non-woven polyamide fiber mat and said second non-woven mat being positioned adjacent to the outer surface of the marginal zone wherein the coarse fibers comprise from about 25 percent to about 60 percent of the combined weights per square meter of the coarse and the fine fiber mats.

2. Foamed plastic articles or structures of claim 1, wherein the foam plastic is a polyurethane.

* * * * *